United States Patent [19]
Fleming, Jr.

[11] Patent Number: 5,562,752
[45] Date of Patent: Oct. 8, 1996

[54] PROCESS OF MANUFACTURING VITREOUS SILICA PRODUCT INCLUDING HYDROTHERMALLY TREATING A COLLOIDAL SOL-GEL

[75] Inventor: James W. Fleming, Jr., Westfield, N.J.

[73] Assignee: Lucent Technologies Inc., Murray Hill, N.J.

[21] Appl. No.: 221,114

[22] Filed: Mar. 31, 1994

[51] Int. Cl.$^6$ .................................................. C03B 37/016
[52] U.S. Cl. ............................. 65/384; 65/395; 65/412; 65/426; 65/17.2; 423/338
[58] Field of Search ........................... 65/395, 17.2, 426, 65/412, 384; 423/338

[56]   References Cited

U.S. PATENT DOCUMENTS

| | | | |
|---|---|---|---|
| 4,650,511 | 3/1987 | Koya | 65/DIG. 16 |
| 4,680,049 | 7/1987 | Onorato | 65/395 |
| 5,243,769 | 9/1993 | Wang | 34/27 |
| 5,356,447 | 10/1994 | Bhanderkar | 65/395 |

FOREIGN PATENT DOCUMENTS

| 3-137028 | 6/1991 | Japan | 65/17.2 |
|---|---|---|---|

*Primary Examiner*—John M. Hoffmann
*Attorney, Agent, or Firm*—George S. Indig

[57]   ABSTRACT

Heating a wet colloidal gel body in an autoclave above its 1-atmosphere boiling point, under rigorously defined conditions, avoids shrinkage during subsequent drying. As a consequence, drying rates may be increased, and handling care becomes less critical.

14 Claims, 2 Drawing Sheets

PROCESS OF MANUFACTURING VITREOUS SILICA PRODUCT INCLUDING HYDROTHERMALLY TREATING A COLLOIDAL SOL-GEL

BACKGROUND OF THE INVENTION

1. Technical Field

The invention is concerned with fabrication of products containing sol-gel-produced high-silica glass. Optical fiber and a wide variety of other products are contemplated.

2. Terminology

Terms of critical meaning to the disclosure are defined.

Sol—A dispersion of particles suspended in a suspension liquid—generally of silica-containing particles in water. Ethyl alcohol is a commonly used non-aqueous suspension liquid. (For, these purposes, minor inclusions in the suspension medium, e.g. for modifying characteristics of the resulting gel, and for controlling the gelation process but not retained in the gel, are ignored.)

High-Silica Glass—Glass composed primarily of $SiO_2$. Minor ingredients do not ordinarily exceed a total of 5 wt %.

Admixed Sol—Sol prepared by mixing already-formed particles with suspension liquid. The gelled product is here referred to as an "admixed gel". (The conventionally used term, "colloidal", sometimes used in the literature to describe an "admixed gel" is avoided.)

Fumed Silica—Particulate $SiO_2$ prepared by flame hydrolysis of an appropriate silicon compound, e.g. of $SiCl_4$, generally using an oxyhydrogen torch. The sol used in the experimental work reported was an aqueous suspension of this form of admixed silica.

Precipitate Sol—As distinguished from an admixed silica sol, a precipitate sol is produced by liquid state reaction within the suspension liquid, for example, of a metalorganic precursor in water. The gelled product is sometimes known as a "polymer gel". The inventive teaching is not applied to precipitate sol.

Gel—A sol which has been gelled so as to be essentially non-fluid. Use of the term does not require total gelation, but only attainment of sufficient structural integrity for needed shape retention.

Overcladding—This refers to a tubular region which, as encompassing a core rod, forms the composite preform from which optical fiber is drawn. A type of overcladding in commercial use is a pore-free self-supporting tube. Alternatives include "direct overcladding", in which a still-porous tube is sintered in situ, to shrink and form a unitary body with the encompassed core rod.

DESCRIPTION OF RELATED ART

Sol-gel manufacture of silica glass has held tantalizing promise for many years. Gelation of an aqueous suspension of silica particles is an economical approach to formation of this desirable glass. Silica glass, with its high melting point and, hence, high cost of preparation, has a variety of properties which are preferable to those of the commonly-used, more easily prepared, low-melting, mixed oxide glasses. As an example, silica glass was responsible for acceptance and commercialization of optical fiber. A suitable alternative has not been found.

Commercial optical fiber is generally produced by a vapor transport process—by Outside Vapor Deposition (OVD) or Vapor Axial Deposition (VAD), both using soot chemistry, or by Modified Chemical Vapor Deposition (MCVD)—all remarkable but expensive processes. Recognition that the functional part of the usual single mode fiber requires but 1–2% of the total cross section of the fiber, has led to a search for a less expensive process for fabrication of cladding to serve the physical requirements of the outer portion of the fiber. Overcladding tubes, made from sand or soot (from "natural" or "synthetic" quartz) have been introduced to serve this need.

Further cost saving is offered by the sol-gel process. In the economically preferred sol-gel process, a suspension of admixed silica particles and water (the sol) would be introduced into a mold and gelled to directly yield the tube (the "near-net shape" body). The gel tube would then be dried and sintered, to produce a pore-free consolidated glass body. Melting and machining would not be necessary.

A significant breakthrough—that of U.S. Pat No. 5,240,488, issued Aug. 31, 1993—overcame the yield-reducing cracking problem, which had prevented industry acceptance. Sol-gel-produced silica glass overcladding is now used in fiber fabrication. The patented process depends on use of a small amount of a transient polymer additive which, after serving to minimize cracking during gel drying, volatilizes during sintering, to leave the desired polymer-free silica product. Free-standing sol-gel tubing made by this process is a promising candidate for general replacement of overcladding now used commercially. The process is under study, also, for manufacture of a broad variety of "near-net shape" non-fiber products.

Drying is a costly part of the sol-gel process. Fabrication of free-standing overclad tubing, for example, depends on slow room-temperature, high relative humidity, air-drying to avoid cracking due to local variations in moisture content in the tubing. Drying periods of a week or more are now prescribed for kilogram-size bodies. Used in fiber production, shape retention of the delicate wet gel overcladding tube, has required supporting rods which are continually rotated, at least, during the initial drying period. The three-point loading strength of the wet gel, as removed from the mold, has a modulus of rupture (MOR) of 0.01–0.05 MPa (mega pascals)—a very low strength, requiring a high degree of care in handling. See, *Annual Book of ASTM Standards*, vol. 15, pp. 372–376, test C674–81 (1985) for description of the 3-point loading test.

The nature of the problem is well understood. George W. Scherer in J. Am. Ceram. Soc., vol. 73, No. 1, pp. 3–14 (1990), in *Theory of Drying*, presents an excellent review. In short, shrinkage has been inseparable from gel drying—in the first or Constant Rate Period of drying (CRP), the tensile forces exerted by the migrating water are sufficient to significantly shrink the pores, and keep them filled ("saturated"). Since uncontrolled surface evaporation is generally more rapid than migration, there is greater pore-shrinkage near the surface. Resulting differential pore shrinkage—greater shrinkage in the surface direction—maintains hydrostatic head during this period. CRP is followed by first and second Falling Rate Periods (FRP1 and FRP2). FRP2 begins as the evaporation front begins to penetrate into the body. During this period, shrinkage results from combined effects—the drying layer expands as tensile forces are relieved, and the inner saturated portion of the body contracts to keep the inner pores filled.

Drying-induced differential shrinkage is the major cause of cracking. To control cracking it has been necessary to slow down the liquid migration rate. To accomplish this, evaporation removal has been slowed by room-temperature drying in humid air—in air maintained at above 60% rel. hum. commonly above 80% rel. hum.

SUMMARY OF THE INVENTION

The invention transforms the process to a rigid-body drying process. Hydrothermal treatment under critically defined conditions results in the "zero-shrinkage" state, such that shrinkage upon drying is no more than 1% in any linear direction. Now that shrinkage, itself, is avoided, rate limitations due to drying-induced differential shrinkage are eliminated. Remaining rate limitations are of two kinds: (1) those imposed by flow rates for migrating water and for vapor through constricting pores; and (2) cracking due to thermally-induced differential shrinkage (e.g. due to "thermal shock"). Significantly increased drying rates—generally at least twice as fast—are now permitted. The advance is of increasing consequence for bodies of increasing thickness, and is important for thin-walled and intricately-shaped bodies.

Drying of "zero-shrinkage" bodies is uncomplicated and has received little attention in the literature. Cracking is only a secondary problem, and rate of drying largely depends on flow rate. Examples are forced drying of speciality composition concrete blocks and statuary, and of "Vycor" (TM— Corning Glass Works).

In arts where extreme purity is required, the "zero-shrinkage" state presents another advantage. Since drying does not reduce pore size, gas treatment of the unconsolidated dried body is facilitated. Examples of gas treatment are dchydroxylation, using a halogen-containing gas such as $Cl_2$, and refractory particle removal as with $SOCl_2$ to remove $ZrO_2$. Other examples arc gas-phase doping for control of refractive index, and bubble removal.

Preferred processing is based on single-cycle, short-term attainment of a temperature of at least 195° C. Processing equivalents, discussed in the detailed description, use recycling. Use of two or more heating-cooling cycles permits attainment of the necessary "zero shrinkage" state at lower temperatures.

Processing within the stated conditions increases wet-gel strength to MOR values of 0.2 MPa or greater. Under preferred processing conditions, strength may be as high as 0.5 MPa or more. In the example of fiber manufacture, wet strength of the overcladding tube is sufficient to make the usual rotating rod supports unnecessary during drying—even to permit resting the tube on a flat supporting surface while drying. It may now be freely hung for uniform surface exposure and to facilitate transportation.

The inventive process may be used in conjunction with the process of U.S. Pat. No. 5,240,488, which depends on sol modification by incorporation of a transient polymer. Strengthening and related advantages, however, do not depend on this process—will likely result in eventual elimination of the polymer. It is useful with any form of sol-gel production based on admixed silica sol.

Detailed description emphasizes shortened drying time—resulting from increased temperature or reduced relative humidity, and to increased liquid flux. The process is sufficiently robust to permit use of uncontrolled relative humidity—drying under unaltered ambient conditions.

Elimination of drying-induced differential shrinkage overcomes the major impediment to use of sol-gel processing. Its immediate impact in fiber fabrication will likely be followed by use in the fabrication of a variety of non-fiber products.

DETAILED DESCRIPTION

I. General

Figure 1:
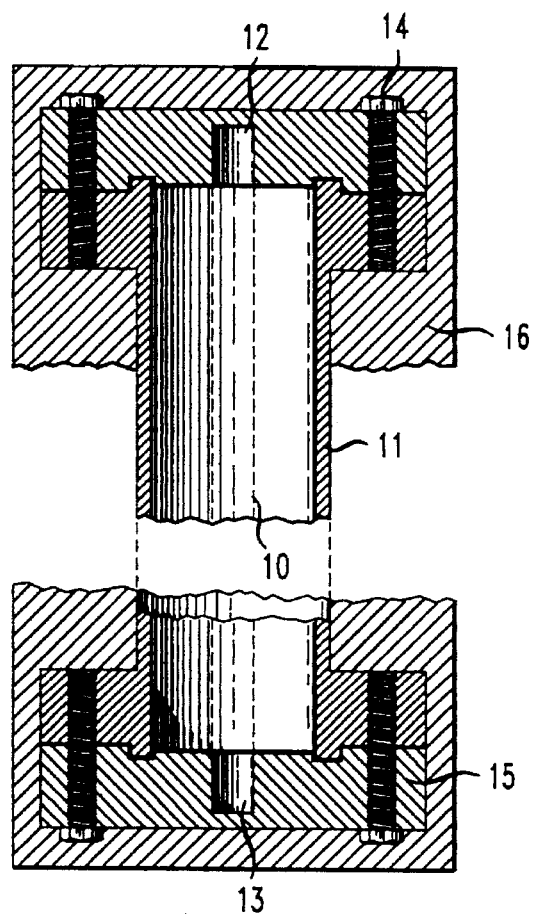
FIG. 1 is a schematic, front elevational view of one form of apparatus used in the Examples.

Introduction of the method of U.S. Pat No. 5,240,488 is provoking new interest in the sol-gel process. The present work further facilitates processing using that method and offers an alternative as well. Increased strength and reduced shrinkage, apart from permitting faster drying and more effective gas treatment, reduces need for care in handling—important considerations in the production of a wide range of articles.

The more promising type of sol-gel processing starts with a sol which is a simple suspension of fine particles. This "admixed suspension" is typically a water suspension of fumed silica of particle size generally below 1 μm. Initially-formed hydrogen bonds are convened to siloxane bonds as in conventional sol-gel processing the hydrothermal processing of the invention increases bond strength in the wet gel by accelerating conversion. There is evidence that a second mechanism—Ostwald Ripening—aids in strengthening neck-down bond regions by dissolution and redeposition of silica.

"Hydrothermal aging treatment" has been used for a different category of gel materials—those produced by "polymerization" from solution. U.S. Pat. No. 5,023,208 issued Jun. 11, 1991 teaches use of a range of conditions overlapping those used in the preferred single-cycle embodiment of the present work for the same purpose (for reducing cracking). This, and earlier work, had provoked experimental hydrothermal processing of the admixed gels of the present invention, only to result in further embrittlement (see the initial region of the curve of FIG. 5). R. Clasen, in "The Journal of Non-crystalline Solids" Vol. 89, p. 337, explains the finding as due to thermally-induced growth of silica crystallites (which then serve to nucleate cracks). For this reason, the author advises against the appealing prospect of hypercritical treatment (which might be thought to avoid the presumed origin of all cracking—the liquid-vapor boundaries themselves). In a sense, this invention is based on the finding that there is, in fact, value in practicing the hydrothermal process on admixed gels. The finding is general—initial strengthening is counterproductive and aggravates the cracking problem. It is the present finding that embrittlement may be overcome by operating above a strengthening threshold—by operating in the "zero-shrinkage" regime.

II. The Sol-gel Process

The inventive advantage is expected to play a role in a large variety of processes. In certain of these, sol-gel processing is now used, and application of the invention may simply take the form of inclusion or substitution of the hydrothermal treatment step. In some, sol-gel processing, now including hydrothermal treatment, will replace other forms of processing.

Sol-gel processing, itself, is a well-developed art. Process steps prior to or subsequent to hydrothermal processing are well-known, and are not discussed in detail. The TABLE of U.S. Pat. No. 5,240,488 is set forth in its entirety. It lists processing steps and conditions practiced in state-of-the art sol-gel processing.

TABLE

| PROCESSING STEP | RANGE | | CONSEQUENCES | |
|---|---|---|---|---|
| | Preferred | Broad | Too Low | Too High |
| 1. Mix silica + water | | | | |
|   a) silica ($m^2$/g surface area) | 30–60 | 20–100 | settles out | pores too small, viscosity too high |
|   b) wt % $SiO_2$ | 40–50 | 30–60 | excessive shrinkage and cracking | excessive viscosity, pore entrapment rapid gelation |
|   c) temperature (°C.) | 20–40 | 0–100 | freeze | boil, excessive evaporation |
| 2. Mix TMAH | | | poor dispersion | |
|   a) wt % based on $SiO_2$ | 1.6–3.2 | 1–6 | slow gelation, soft gels | rapid gelation, brittle gels non-transparent glass |
|   b) mixing time (min) | 3–8 | 1–30 | poor mixing | contamination, sol heats up |
| 3. Mix polyethyloxazoline | | | | |
|   a) wt % based on $SiO_2$ | 0.1–0.6 | 0.05–1 | tendency to crack | non-transparent glass |
| 4. Mix glycerin | | | | |
|   a) wt % based on $SiO_2$ | 0.5–2 | 0–10 | tendency to crack | gel too soft |
| 5. Aging | | | | |
|   a) aging time (hr) | 1–20 | 0.5–200 | poor gelation | brittle or cracked gel |
|   b) aging temperature (°C.) | 20–30 | 10–60 | inconvenient, slow | brittle or cracked gel |
| 6. Add gelation agent (equivalents*/TMAH) | 1.2–1.4 | 0.5–2 | too soft | brittle or cracked gel |
| 7. Pour into mold, deaerate | N/A | N/A | N/A | N/A |
| 8. Gel aging (hr) | 1–24 | 0.25–100 | soft weak gel | brittle or cracked gel |
| 9. Extraction of gelled body | N/A | N/A | N/A | N/A |
| 10. Gel Drying on Rollers | | | | |
|   a) Temp (°C.) | 10–30 | 0–80 | too slow | weak dried body, cracked gel |
|   b) RH (%) | 75–95 | 30–99 | cracking, weak dried body | too slow |
|   c) Rotation (rpm) | 0.1–1 | 0.01–10 | deformation | exfoliation of surface |
| 11. Removal of Volatiles (including organic materials) | | | | |
|   a) Temperature (°C.) | 120–300 | 100–500 | Cracks when heated | unnecessary, interferes with dehydroxylation |
|   b) Heating rate (°/hr) | 3–10 | 1–50 | slows process | cracking |
|   c) Atmosphere (% $O_2$) | 20 | 5–100 | carbon residue | ignition of organics |
| 12. Dehydroxylation | | | | |
|   a) Temperature (°C.) | 500–1000 | 300–1100 | OH and metals remain | traps $Cl_2$, $O_2$ and impurities |
|   b) Time (hr) | 1 . 5 | 0.1–20 | OH and metals remain | expensive, no added value |
|   c) Atmosphere | | | | |
|     1. $Cl_2$ (%) | 3–6 | 1–100 | OH and metals remain | excessive incorporation in glass |
|     2. $O_2$ (%) | 0–10 | 0–90 | residual carbon | OH and other impurities remain |
|   d) Heating rate (°C./hr) | 100–200 | 50–500 | slows process | furnace damage, cracking |
| 13. Sintering (30 cm hot zone) (He atmosphere) | | | | |
|   a) Temperature (°C.) | 1300–1500 | 1200–1750 | incomplete densification | excessive deformation, expensive |
|   b) Pull rate (cm/hr) | 15–100 | 5–200 | process slow, excessive | cracking, incomplete densification |

Table Notes:
Where temperature range is not specified, room temperature (e.g., 15–30° C.) is used.
*Number of compensating units, i.e., number of hydrogen-yielding units in the pH-lowering compound as divided by the number of Oh-yielding units in the pH-increasing compound (i.e., in the TMAH).

The following discussion addresses permitted alternatives to the numbered steps in the TABLE, when using hydrothermal drying. While more generally applicable, conditions are for the demanding instance of fiber fabrication. General comments are not reproduced from that patent and are incorporated by reference.

1. This step describes the initial admixed sol. Hydrothermal treatment is a factor in permitting use of the higher silica concentrations within the prescribed limits.

A cause of reduced fiber yield has been alleviated by mechanical and/or chemical removal of $ZrO_2$ and other refractodes. See U.S. patent application Ser. No. 08/029753 now U.S. Pat. No. 5,356,447, and U.S. patent application Ser. No. 08/029750 now U.S. Pat. No. 5,344.475, both filed Mar. 11, 1993. Centrifuging is usefully introduced at this stage for mechanical removal.

2. Briefly, TMAH introduced in this step, serves as "dispersant". The amount is sufficient to bring pH within the range of 11–14. Suitable alternatives include higher homologs of TMAH. As in the patent from which the TABLE is taken, reference to TMAH, the dispersant of choice at this time, is not intended to be limiting. The range of inclusion is sufficient to induce like ionic charges on the particles, to assure repulsion and to avoid agglomeration. Specific discussion assumes usual sol alkalinity. The same considerations apply to operation in the corresponding acidic pH range.

3. Hydrothermal treatment lessens importance of polymer, and may make it unnecessary.

With elimination of drying-induced differential shrinkage, "tendency to crack" is not a likely consequence of exceeding the stated range. While there is no cracking danger in use of greater amounts of polymer, there is little advantage. Use of lesser amounts—elimination altogether—is viable.

4. Use of glycerin continues to be a safeguard, but is of reduced importance. It too, may be eliminated.

5. The aging of this step is generally unaffected by the invention.

6. Unaffected—Here, as elsewhere in the description, gelation is the result of decreasing pH. Examples of suitable gelation ingredients are methyl formate and its higher homologs. Gelation may be induced by increasing pH of acid sols.

7. No change.

8. Gel aging is of less consequence. A main remaining purpose is assurance of syneresis (shrinkage of the gelling material) to expedite removal from the mold. For this purpose, ¼% reduction in linear dimension is sufficient. Where syneresis is unnecessary, the step may be omitted. (The syneresis process, itself, does not appear to be affected by hydrothermal treatment. Shrinkage during the gelling process, itself, permits ready removal of the wet gel from the mold.)

9. The hydrothermal treatment of the invention has implications here. "Launching" (removal of the cast body from the mold) is no longer a critical step. There is no longer need for water immersion during extraction.

10. While uniform drying is assured by constant rotation and by other precautions for non-tubular bodies, the strengthened gel no longer requires these precautions to avoid distortion. Drying uniformity, itself less critical, is aided by freely suspending the body.

11, 12. These procedures, as well as others dependent upon gas migration, are expedited by the increased pore-size accompanying shrinkage reduction. Treatment times may be reduced.

13. No change.

III. Hydrothermal Processing

Hydrothermal processing is first discussed in terms of the preferred, single-cycle embodiment. Alternatives, including use of a substantial holding period at maximum temperature, as well as multiple-cycle embodiments, are discussed in a separate section, "Alternative Processing Conditions".

1) Processing, before heating, including formation of the sol, incorporation of various additives, etc. has been described. Experimental results are consistent with changes brought about in the often postulated particle network which begins to form prior to or at the onset of gelation. Strength discussed is that of the gel immediately prior to drying. While there may be some further strengthening during drying, the inventive advance depends on strengthening prior to drying which increases tolerance to drying stress. Hydrothermal processing may be begun at various states of gelation. In tube production, using a two-part mold, it is convenient to gel partially to avoid distortion during removal of the mandrel. In the usual two-part annular mold, the favored slight shrinkage or "syneresis", which assures separation of the body from the containing mold wall, has a tendency to cause sticking at the interface of the body and the contained rod or "mandrel", and, itself, leads to need for its removal before hydrothermal treatment. Gelling to a strength of 0.01 MPa is sufficient for removal.

Except for such special circumstances, hydrothermal treatment may be initiated as convenient—before or during gelation. Whether operating on ungelled or partially gelled material, gelation will likely continue during, and may continue to some extent after hydrothermal treatment.

2) The mold may be retained to serve as an autoclave if it can be hermetically sealed to accommodate pressure buildup. Whether or not a separate autoclave is used, any mold members encompassed within the gel body are removed.

3) Where a separate autoclave is used—where there is a substantial enclosed space outside of the unsealed mold—it may be useful to introduce suspension medium into that space to avoid premature drying (drying before attainment of the "zero shrinkage" state). Assured saturation throughout the entire sealed environment avoids this problem. The introduced liquid suspension medium should be kept out of contact with the gel body to avoid dissolution. Removal of a sufficiently gelled body from the mold, and introduction into a separate autoclave, may be appropriate.

4) The autoclave—whether the mold itself or a separate chamber—is now sealed to withstand pressure to be developed during hydrothermal treatment. (A pressure of 260 psi is developed by heating an aqueous gel to 200° C.)

5) The assemblage, now hermetically sealed, is heated. Rate of heating has not been found critical. In conventional processing, the limiting heating rate decreases with increasing size. For practical reasons, larger bodies will take longer to heat, although increased rate will not present the same danger of cracking. In accordance with good engineering practice, a heating rate of 12° C./hr was used in fabrication of an overcladding tube 6 ft. long×1 in. id×3 in. od. This heating rate avoided thermal gradients greater than 20° C./cm. In other experiments, a heating rate of 50° C./hr was used, without adverse effect.

6) There is an absolute requirement that a temperature of at least 195° C. be reached during the preferred single-cycle embodiment of an aqueous gel to attain the required zero-shrinkage state. Lower temperature processing increases brittleness without sufficient compensating strengthening, may even be disadvantageous. Higher temperatures—at values up to 230° C. and higher—further promote strengthening, and, aside from equipment considerations, are preferred. Operation at or above the critical point, which for water is 374° C., offers little strengthening improvement, and is generally unjustified.

7) The significance of attained temperature is discussed in section IV. "Mechanism". The critical "zero shrinkage" state is primarily dependent on attained temperature. The body is maintained at temperature only so long as needed for thermal equilibration—to assure attainment throughout the gel body. Cooling rate, as well as heating rate, is of little consequence. Cracking in the wet state, is not ordinarily a concern. Experimentally, kilogram-size bodies have been quenched by water immersion without cracking. Good engineering practice is satisfied by maintenance of cooling rates below 50° C./min. The precaution of slower cooling—at 10° C./min. or less—may be desired for fragile shapes. Conditions to assure temperature gradients of a maximum of 20° C./cm—preferably 10° C./cm—within the temperature range down to 150° C., are easily satisfied, and are sufficient to avoid thermally-induced cracking.

8) Hydrothermal treatment has had its major effect at attained temperature although some further strengthening during cooling to 150° C., and to lesser extent at still lower temperature, cannot be fully discounted.

9) Strength improvement has been at least 5 times greater—to a final strength of at least 0.2 MPa. Higher values—within the range of 0.5–0.8 MPa—have been regularly attained with treatment at 200° C.

Alternative Processing Conditions

The invention thus far has been described as a single-cycle process with an attained temperature of at least 195° C. For most purposes, this is the likely embodiment to be used. Where there is sufficient reason for avoiding high temperatures, multi-cycle operation may be used. Experimentally, "zero-shrinkage" has resulted with attained temperatures as low as 175° C. in 2-cycle processing. In principle, additional recycling may permit still lower temperature processing. For most purposes, such a process is overly time-consuming. Very long holding times—one or several hours or more—may also permit lowered temperature treatment.

Drying

Shortened drying time is the most important consequence of the advance. The strengthening associated with attainment of "zero shrinkage" is assurance of a permitted rate-of-drying at least twice that without hydrothermal treatment. The inventive hydrothermal treatment, in producing the "zero-shrinkage" state, transforms the drying problem to one for rigid body drying. Quantification of the improvement is complex, and depends on less restricting, but still consequential factors. Process details will depend upon properties of the now-rigid body. Ultimately, drying conditions will depend upon such factors as toleration for thermally-induced differential shrinkage, on body strength, and on other material properties. Process optimization is left to the design engineer.

Drying itself is a complex phenomenon. Perry's Chemical Engineers' Handbook, Sixth Ed. at pp. 20–3 through 20–14 describes it as entailing three consecutive phases. The first—the Constant Rate Period (CRP)—assumes greater significance for the traditional high-shrinkage gel case. CRP has been prolonged by 10–12 linear % drying-shrinkage, which maintains saturation well beyond that for the rigid case.

Elimination of drying-induced diffferential shrinkage continues to permit more rapid drying after CRP—during the falling rate periods—but with differing process consequences. During the constant rate period, drying rate is, to large extent, responsive to the pressure gradient between the surface and the ambient (the gradient between the surface vapor pressure and the ambient partial pressure). Subsequently, the process becomes increasingly dependent on migration rate—on the "flux" of liquid and vapor phase water within the body. Since drying rate is essentially independent of evaporation rate, temperature and relative humidity of the ambient are of little effect. The now controlling flux rate increases with increasing body temperature. Liquid flux rate is determined by viscosity, permeability and pressure gradient.

The advance may be expressed in different terms. The entire drying problem in traditional sol-gel processing—drying induced differential shrinkage—is due to inherently slow flux rate. Permitting evaporation to proceed under usual conditions results in a significant shrinkage gradient which causes cracking. The solution was to sufficiently restrict evaporation rate so that it was reduced to a value comparable to the flux rate. By restricting evaporation sufficiently, the process could proceed with near-uniform shrinkage. Unfortunately, for larger bodies e.g. for overcladding tubes of 1 kg or larger, it was necessary to significantly restrict evaporation which unduly prolonged drying.

The rapid drying now attainable is properly regarded as a consequence of the near-zero shrinkage state, which, in turn, permits operation without unduly restricting evaporation rate. The invention achieves its rapid-drying objective by changing the nature of the drying process. With the elimination of differential shrinkage, the gel body may be heated to further shorten drying time. Heating continues to be effective during the falling rate periods by increasing flux rate.

To some considerable extent, beyond accommodating migration path length, process design no longer depends on body thickness. Conditions for thin-wall body drying are also eased—since uneven surface drying no longer results in shrinkage-related cracking.

Need to avoid cracking in traditional processing has been satisfied by room temperature operation under high relative humidity—at relative humidity values above 60%. With elimination of this consideration, drying will likely be conducted at relative humidity values of 50% and lower—possibly of 20%. For small production runs, it may be useful to use existing ambient conditions without humidity control. As in drying of all sol-gel bodies, hydrothermal treatment now permits heating of the tubular preform. Heating to the boiling point is permitted. Drying may be conducted under varying temperature conditions. It may be useful to increase temperature as drying proceeds to offset decreasing rate during FRP1 and FRP2.

IV. Mechanism

The advance sheds new understanding on gelation, and has implications beyond that of the claims. Contributions to strengthening take two complementary forms:

A. The more significant mechanism is bond strengthening. Initial hydrogen bonds (Si—O—H—H—O—Si) are converted into siloxane bonds (Si—O—Si). In traditional processing, this strengthening has largely awaited drying. Hydrothermal treatment accelerates bond conversion to produce a strong still-wet body. There is the possibility that "new" siloxane bonds are formed (where hydrogen bonds did not already exist). Resulting siloxane bonds, under prescribed invention conditions, are, in any event, sufficient for attaining the desired balance between strengthening and embrittlement.

B. Description of gelation conventionally invokes "Ostwald Ripening". In accordance with this phenomenon, the strength of the particle-to-particle bonds is increased by the precipitation of siloxane bonded silica at neck-down regions. This redeposition, like bond conversion, is energetically driven. This process, too, is accelerated for the temperatures and pressures attained in hydrothermal processing. Increased silica solubility, increases the rate of dissolution-redeposition. The process is understood—smaller (high-free energy) particles are preferentially dissolved, and redeposit at positions of smallest negative radius. The net result is free energy decrease. Ostwald Ripening is accelerated at hydrothermal treatment temperatures. The dropping temperature period, following heating, with its further decreasing solubility for silica, may also play a role.

There is empirical proof that the low-energy condition, which drives Ostwald Ripening is not attained under practical conditions—under prolonged holding or with repeated cycling. There is no danger of losing porosity and producing the single, pore-free spherical silica body which corresponds with lowest energy.

V. Optical Fiber

Although advantages gained through hydrothermal processing are applicable to a broad range of products, it will, likely, have its first significant impact in the fabrication of optical fiber. U.S. Pat. No. 5,240,488 emphasizes an expected role for sol-gel in fiber fabrication, and reliance is had on that patent for detailed discussion. It describes fiber drawing from a composite preform produced from a core rod within an overcladding tube. The rod is made by use of a conventional vapor transport process such as Modified Chemical Vapor Deposition (MCVD), or a "soot" process such as Vapor Axial Deposition (VAD) or Outside Vapor Deposition (OVD). The overcladding tube is free-standing—produced by consolidation of a dried gel body. Direct overcladding—consolidation about the already-encompassed core-rod—is also visualized.

There is a specific advantage of particular consequence in fiber fabrication. In fabrication of the composite preform, any substantial warpage of the overcladding tube interferes with close spacing to the core rod. Avoidance of warpage has required very slow drying. The particular advantage of the inventive procedure is clear from George Scherer's writings (see "Theory of Drying", cited above). In the last column of p. 8, in describing FRP2, he describes the mechanism for the observed warpage. It invokes drying-induced differential shrinkage, which the present invention avoids. He ascribes convex warpage (as viewed from the drying surface) to contraction of the inner saturated region relative to the drying surface region.

A specific embodiment contemplates fiber fabrication from a composite preform using a free-standing unconsolidated overcladding tube.

VI: Figures

The mold of FIG. 1 may, itself, be sealed for autoclaving. It is designed for production of a self-supporting overcladding tube, which together with a preform core rod, constitutes the composite preform from which optical fiber is drawn. It consists of removable mandrel 10 (shown in dashed lines), enclosed within outer mold 11. Mandrel 10 is supported within recesses 12 and 13 in covers 14 and 15. Mold 11, in turn, is enclosed within heating jacket 16.

The FIG. 1 apparatus was used in developing some of the reported experimental results. The outer mold 11 was stainless steel, and of dimensions: 6 feet long; wall thickness ⅜; inner diameter 3". The apparatus was tilted at 45° to reduce the fluid pressure head and to reduce sticking.

Figure 2:
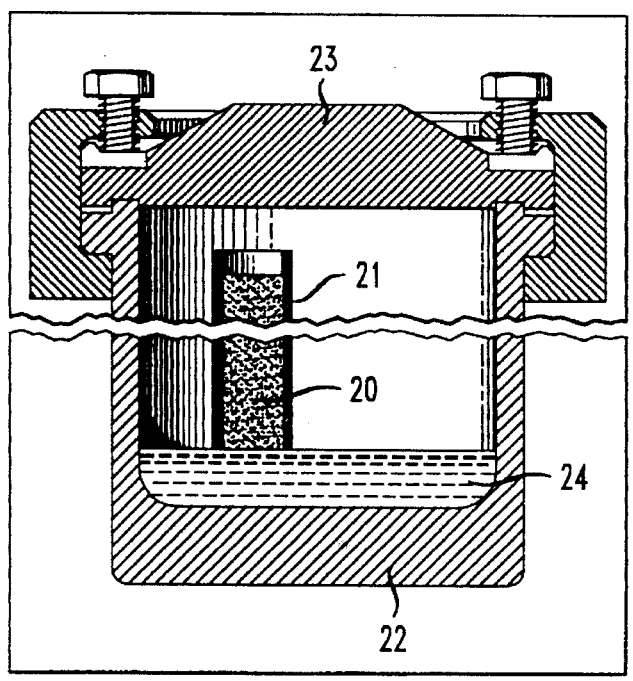
FIG. 2 is a schematic, front elevational view of a second type of apparatus used in the example.

In FIG. 2, a gel sample 20 is contained within mold 21. This, in turn, is enclosed in a hermetically-sealed autoclave consisting of receptacle 22 and cover 23. Additional suspension fluid 24 is, in amount sufficient to assure saturation of the ambient within the autoclave. (Liquid contact with the gel body is avoided to prevent dissolution.) The autoclave used experimentally, was cylindrical in shape—was 24 in. high and had an inner diameter of 12 in.

The final three figures are data plots for the Examples.

Figure 3:
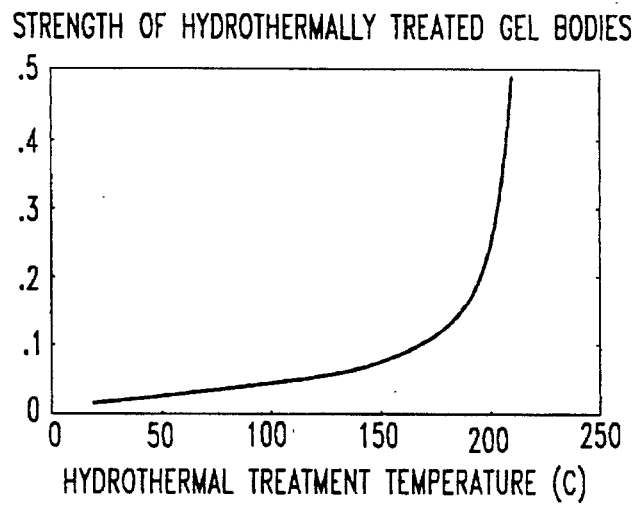
FIG. 3 is a plot relating modulus of rupture, MOR (on the ordinate) and temperature (on the abscissa) for an illustrative process of the invention.

FIG. 3, on coordinates of Modulus of Rupture, in units of megapascals, and attained temperature, in degrees centigrade, relates wet gel strength to temperature for single-cycle hydrothermal treatment. A temperature of 195° C. was sufficient for a sharp upturn in strength (to an MOR of 0.2 MPa), corresponding with attainment of the zero-shrinkage state.

Figure 4:
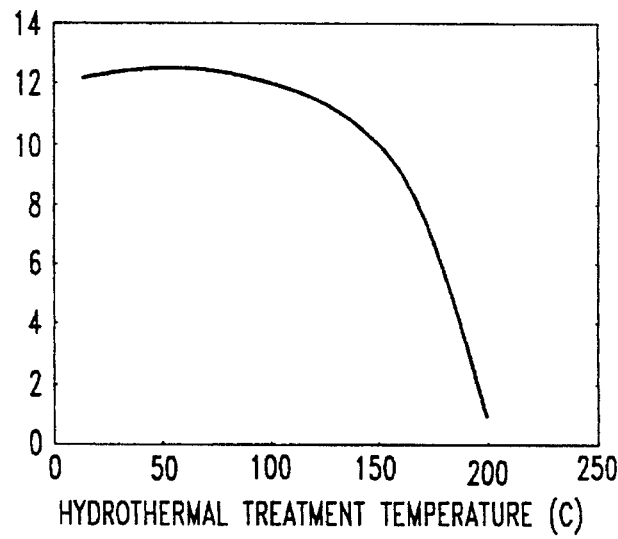
FIG. 4 is a plot which relates shrinkage of a strengthened gel to temperature of hydrothermal treatment.

FIG. 4 relates shrinkage during drying, as a percentage of the most affected linear dimension of the gel body, to attained temperature in single-cycle hydrothermal treatment.

Figure 5:
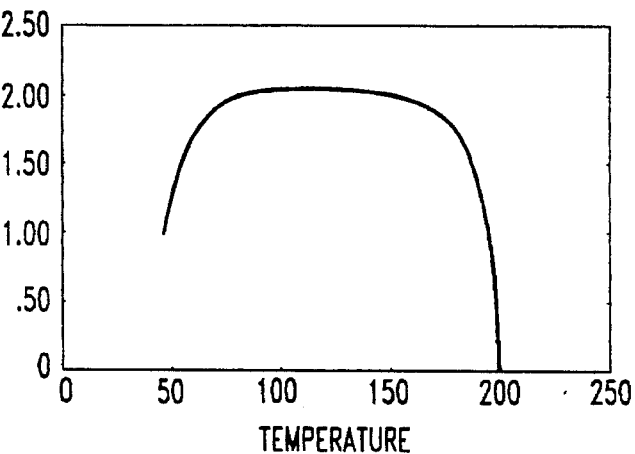
FIG. 5 is a plot which relates breaks (on the ordinate) to attained temperature (on the abscissa), for the preferred, single-cycle, embodiment.

FIG. 5 relates incidence of cracks during drying to attained temperature in a single-cycle process.

VII. Examples

The following examples are based on Example 6 of U.S. Pat. No. 5,240,488. Unless otherwise noted, all used the formulation and conditions of that example.

The general formulation of Example 6 of U.S. Pat. No. 5,240,488 was used in preparation of a six-foot gel tube.

Briefly, the formulation was: 2500 grams silica sol; 125 grams aqueous TMAH (tetramethylammoniumhydroxide), 3.2 grams polyethyloxazoline in water, and 15 grams glycerin.

The sol was aged overnight, was cooled in an ice-bath; 25 grams of methyl formate was added with stirring to result in gelation in 20 minutes; and the cast body was dried. Wet and dry weights of the tube were 13 kg and 5.5 kg.

The apparatus is shown in FIG. 1.

EXAMPLES 1 AND 2

Both examples used conventional processing. They did not use hydrothermal treatment.

Example 1 used the drying procedure of Example 6 of the prior patent.

The tubular body was dried in air at 15° C. and 80% r.h., while supported on rotating rollers, over a period of seven days. No cracks were evident. Example 2 was identical except that use of uncontrolled ambient air (22° C. and 25% r.h.) shortened drying time to 2 days. The tube fractured during the first day. Total shrinkage upon drying was the same as for Example 1—about 12% for each of the dimensions of length and diameter.

EXAMPLE 3

The formulation was identical to that of Examples 1 and 2. The procedure was the same as in Example 2 except that the gel body was hydrothermally treated.

Following introduction of gelling agent—of 25 grams of methyl formate—and stirring (to result in substantial gelation in 20 minutes), the gel was aged for 16 hours at 20° C. The mandrel was then removed, and the mold was sealed.

Hydrothermal treatment consisted of first heating, from the initial value of 20° C. to a final attained value of 210° C., at a rate of 12° C./hour. Temperature was then held for 5 hours, after which the body was cooled at a rate of 12° C./hour to a final temperature of 20° C., the seal was broken, and the body removed.

Drying conditions were identical to those of Example 2. The body dried within a period of two days without cracking. Shrinkage on drying was less than 1.0%.

EXAMPLES 4–21

Tabulated Examples

| Example | Hold Temperature | Heating Rate (C/min) | Cooling Rate (C/min) | Hold Time (hrs) | Polymer Added | Sample Diameter (mm) | Hydrothermal Cycling | Dried Sample Condition |
|---|---|---|---|---|---|---|---|---|
| 4 | 65 | 10 | 10 | 1 | | 12 | yes | breaks |
| 5 | 65 | 50 | 50 | 10 | yes | 25 | yes | breaks |
| 6 | 65 | 50 | 50 | 10 | yes | 12 | yes | breaks |
| 7 | 100 | 10 | 10 | 10 | yes | 60 | | breaks |
| 8 | 100 | 50 | 50 | 10 | yes | 12 | | breaks |
| 9 | 100 | 50 | 50 | 1 | | 25 | | breaks |
| 10 | 150 | 10 | 50 | 1 | yes | 25 | | breaks |
| 11 | 150 | 50 | 50 | 10 | | 60 | | breaks |
| 12 | 150 | 50 | 10 | 10 | | 12 | | breaks |
| 13 | 175 | 10 | 50 | 10 | yes | 25 | yes | no breaks |
| 14 | 175 | 50 | 10 | 10 | yes | 60 | | breaks |
| 15 | 175 | 50 | 50 | 1 | | 12 | yes | no breaks |
| 16 | 200 | 10 | 50 | 10 | | 60 | | no breaks |
| 17 | 200 | 50 | 50 | 1 | yes | 12 | | no breaks |
| 18 | 200 | 50 | 10 | 10 | yes | 25 | | no breaks |
| 19 | 225 | 10 | 50 | 10 | yes | 12 | | no breaks |
| 20 | 225 | 50 | 10 | 10 | | 25 | | no breaks |
| 21 | 225 | 50 | 50 | 1 | yes | 60 | | breaks |

Unspecified formulations and process conditions, in the tabulated examples, were as in Example 1 (Example 6, U.S. Pat. No. 5,240,488). So for example, "Polymer Added" signifies addition of 3.2 grams polyethyloxazoline/2500 grams silica sol, or 0.128 wt % of this polymer on this basis. Gel bodies were rod-shaped and 12 in. long. Where the sample was subjected to "Hydrothermal Cycling" heating, holding, and cooling were repeated under identical conditions, to result in a two-cycle process. Upon removal from the mold, they were tested for strength, and dried in ambient air at 20°–24° C. and 20–40% r.h.

All samples which withstood breakage ("no breaks") had a MOR of at least 0.2 MPa, as measured by 3-point loading.

Unreported experimental work used varying processing conditions. Studies showing substantial independence of holding time, involved diminishing holding periods down to 25 minutes. This holding time (for a 25 mm diam. sample) was considered necessary for attainment of ±10° C. uniformity. This degree of uniformity may not be required for commercial operation.

"Hold Temperature", in the Tabulated Examples, was varied over the broad values shown. Additional experimentation served for the temperature-dependent properties in FIGS. 3–5. As shown, reliable improvement required attainment of 195° C. in single-cycle processing. Equivalent results for dual cycling were obtained by heating to 175° C. (There is no requirement for multiple cycling to the same temperature.) In general, processing time is the controlling factor in commercial practice, so that single-cycle processing, to 195° C. or greater, is preferred. No effort has been made to refine the relationship between attained temperature and number of cycles. The uniform requirement is attainment of the "zero shrinkage" state.

What is claimed is:

1. Process for fabricating an article, at least in part composed of high silica glass, the process including fabricating a high-silica glass body from a sol consisting primarily of silica particles in water, the process comprising the process steps of gelling the said sol to result in a wet gel body, drying the wet gel body so as to substantially remove the water, thereby producing a dried gel body, firing the dried gel body to produce a consolidated high-silica glass body, wherein the improvement comprises subjecting the wet gel body to hydrothermal treatment, hydrothermal treatment entailing heating the wet gel body to attained temperature of at least 195° C., and cooling, wherein the attained temperature of the wet gel body is sufficient to result in the "zero shrinkage" state, defined as degree of shrinking upon drying during "the drying" step which does not exceed one percent in any linear dimension of the wet gel body, whereby the Modulus of Rupture strength of the wet gel body at the commencement of drying is at least 0.2 MPa as measured by 3-point loading.

2. Process of claim 1 in which the sol includes a dispersant.

3. Process of claim 2 in which the hydrothermal treatment consists essentially of single-cycle heating.

4. Process of claim 3 in which in which the wet gel body is freely suspended during a portion of said hydrothermal treatment.

5. Process of claim 3 in which the dried body is treated by a gas phase reactant.

6. Process of claim 5 in which the dried body is dehydroxylated by use of a chlorine-containing gas.

7. Process of claim 5 in which the dried body is exposed to thionyl chloride to remove $ZrO_2$ particles.

8. Method of claim 3 in which the article is optical fiber, in which the high-silica glass body constitutes an overcladding tube, and in which the method further comprises drawing a fiber from a fiber preform produced by collapsing of the tube so as to bring it into intimate contact with an enclosed core rod consisting of a core portion within an inner cladding portion, said core rod being produced by deposition using a process selected from the group consisting of Modified Chemical Vapor Deposition and a soot deposition process selected from the group consisting of Vapor Axial Deposition and Outside Vapor Deposition.

9. Method of claim 8 in which the tube is a free-standing, consolidated tube.

10. Process of claim 2 in which the hydrothermal treatment includes multiple cycle heating.

11. Process of claim 10 in which the hydrothermal treatment consists essentially of dual-cycle heating and in which the attained temperature in each cycle is at least 175° C.

12. Process of claim 1 in which the said drying step is carried out in ambient air which attains a relative humidity value at least as low as 40% during the drying step.

13. Process of claim 1 in which the drying step is carried out in uncontrolled ambient air.

14. Process of claim 1 in which the drying step is flux-controlled.

* * * * *